US009491105B2

(12) United States Patent
Zhou et al.

(10) Patent No.: US 9,491,105 B2
(45) Date of Patent: Nov. 8, 2016

(54) METHOD AND APPARATUS FOR ADAPTIVE FAST START IN LINK AGGREGATION

(71) Applicant: Cisco Technology, Inc., San Jose, CA (US)

(72) Inventors: Yuchen Zhou, Petaluma, CA (US);
Chia Alex Tsai, Cupertino, CA (US);
Yibin Yang, San Jose, CA (US);
Rajagopalan Janakiraman, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 11 days.

(21) Appl. No.: 14/582,085

(22) Filed: Dec. 23, 2014

(65) Prior Publication Data

US 2015/0117188 A1    Apr. 30, 2015

Related U.S. Application Data

(63) Continuation of application No. 13/466,715, filed on May 8, 2012, now Pat. No. 8,942,089.

(51) Int. Cl.
| | | |
|---|---|---|
| *H04L 12/841* | (2013.01) | |
| *H04L 12/709* | (2013.01) | |
| *H04L 12/823* | (2013.01) | |
| *H04L 12/801* | (2013.01) | |
| *H04L 12/26* | (2006.01) | |
| *H04L 12/835* | (2013.01) | |

(52) U.S. Cl.
CPC ........... *H04L 47/28* (2013.01); *H04L 43/0852* (2013.01); *H04L 45/245* (2013.01); *H04L 47/12* (2013.01); *H04L 47/323* (2013.01); *H04L 47/30* (2013.01); *Y02B 60/33* (2013.01)

(58) Field of Classification Search
CPC .............. H04L 47/10; H04L 47/2441; H04L 2012/5631; H04L 47/15; H04L 47/70; H04L 47/35; H04L 47/30; H04L 47/32; H04L 47/127; H04L 5/0053; H04J 3/12; H04J 3/125
USPC ........ 370/230, 237, 235, 236, 410, 196, 522
See application file for complete search history.

(56) References Cited

U.S. PATENT DOCUMENTS

| | | | | |
|---|---|---|---|---|
| 6,075,769 | A * | 6/2000 | Ghanwani | ............. H04L 47/263 370/229 |
| 6,163,543 | A | 12/2000 | Chin et al. | |
| 6,614,755 | B1 * | 9/2003 | Dote | ....................... H04L 47/10 370/230 |
| 7,274,694 | B1 | 9/2007 | Cheng et al. | |
| 7,602,726 | B1 | 10/2009 | Sundaresan et al. | |

(Continued)

OTHER PUBLICATIONS

Finn, Norman, "Port Aggregation Protocol," Cisco Systems, Inc., May 1, 1998, pp. 1-27.

(Continued)

*Primary Examiner* — Warner Wong
(74) *Attorney, Agent, or Firm* — Polsinelli PC

(57) ABSTRACT

In one embodiment, a period between periodic transmissions of protocol data units (PDUs) used to form or maintain a link aggregation group is initially set to a fixed value. When a stress condition is detected, the period between periodic transmissions of PDUs is increased from the initial value. When the stress condition is determined to have eased, the period between periodic transmissions of PDUs is reduced back toward the fixed value.

19 Claims, 5 Drawing Sheets

(56) References Cited

U.S. PATENT DOCUMENTS

| | | | |
|---|---|---|---|
| 7,649,906 B2 | 1/2010 | Wilson et al. | |
| 7,729,361 B2 | 6/2010 | Ma et al. | |
| 7,808,927 B2 | 10/2010 | Retana et al. | |
| 7,876,764 B2 | 1/2011 | Binetti et al. | |
| 7,940,661 B2 | 5/2011 | Ervin et al. | |
| 2006/0007914 A1* | 1/2006 | Chandra | H04L 29/06027 370/352 |
| 2006/0013137 A1* | 1/2006 | Ni | H04L 41/0896 370/235 |
| 2006/0039384 A1 | 2/2006 | Dontu et al. | |
| 2007/0183313 A1 | 8/2007 | Narayanan et al. | |
| 2007/0201380 A1 | 8/2007 | Ma et al. | |
| 2007/0226333 A1* | 9/2007 | Morich | G06F 11/0709 709/224 |
| 2008/0205263 A1* | 8/2008 | Cooley | H04L 41/5054 370/218 |
| 2008/0267070 A1 | 10/2008 | Mannal et al. | |
| 2010/0302935 A1 | 12/2010 | Zhang et al. | |
| 2011/0170408 A1* | 7/2011 | Furbeck | H04L 47/10 370/230 |
| 2011/0280124 A1* | 11/2011 | Unger | H04L 41/04 370/230 |
| 2012/0016986 A1* | 1/2012 | Jacquet | H04L 47/10 709/224 |
| 2012/0236715 A1* | 9/2012 | Vitt | H04L 47/24 370/230 |
| 2012/0320914 A1 | 12/2012 | Thyni et al. | |
| 2013/0148512 A1* | 6/2013 | Sarwar | H04L 41/042 370/252 |
| 2013/0294259 A1 | 11/2013 | Lee et al. | |
| 2013/0301427 A1 | 11/2013 | Tsai et al. | |

OTHER PUBLICATIONS

"IEEE Standard for Local and Metropolitan Area Networks-Link Aggregation: 802.1AX™ 2008," IEEE Computer Society, Nov. 3, 2008, pp. 1-163.

"Configuring Fast EtherChannel and Gigabit EtherChannel," Cisco Systems, Inc., Apr. 5, 2007, pp. 1-16.

"Configuring mLACP for Server Access," Cisco Systems, Inc., Apr. 24, 2012, pp. 1-26.

"IEEE 802.3ad Link Bundling," Cisco Systems, Inc., Dec. 4, 2006, pp. 1-40.

"Notification of Transmittal of the International Search Report and the Written Opinion of the International Searching Authority, of the Declaration," International Filing Date: Apr. 29, 2013, International Application No. PCT/US2013/038616, Applicant: CISCO Technology, INC., Date of Mailing: Jul. 25, 2013, pp. 1-8.

* cited by examiner

| | |
|---|---|
| DESTINATION ADDRESS | 405 |
| SOURCE ADDRESS | 410 |
| LENGTH/TYPE | 415 |
| SUBTYPE | 420 |
| VERSION NUMBER | 425 |
| TLV TYPE=ACTOR INFORMATION | |
| ACTOR INFORMATION LENGTH | |
| ACTOR SYSTEM PRIORITY | |
| ACTOR SYSTEM | |
| ACTOR KEY | |
| ACTOR PORT PRIORITY | |
| ACTOR PORT | |
| ACTOR STATE | 435 |
| ACTOR PERIODIC TIME | 440 |
| RESERVED | 445 |
| TLV TYPE=PARTNER INFORMATION | |
| PARTNER INFORMATION LENGTH | |
| PARTNER SYSTEM PRIORITY | |
| PARTNER SYSTEM | |
| PARTNER KEY | |
| PARTNER PORT PRIORITY | |
| PARTNER PORT | |
| PARTNER STATE | 455 |
| PARTNER PERIODIC TIME | 460 |
| RESERVED | 465 |
| TLV TYPE=COLLECTOR INFORMATION | |
| COLLECTOR INFORMATION LENGTH | |
| COLLECTOR MAX DELAY | |
| RESERVED | |
| TLV TYPE=TERMINATOR | |
| TERMINATOR LENGTH | |
| RESERVED | |
| FCS | |

400

ACTOR INFORMATION TLV 430

PARTNER INFORMATION TLV 450

COLLECTOR TLV 470

TERMINATOR TLV 480

METHOD AND APPARATUS FOR ADAPTIVE FAST START IN LINK AGGREGATION

RELATED APPLICATIONS

This application is a continuation of U.S. patent application Ser. No. 13/466,715, entitled "METHOD AND APPARATUS FOR ADAPTIVE FAST START IN LINK AGGREGATION," filed May 8, 2012, which is incorporated by reference in its entirety and for all purposes.

TECHNICAL FIELD

The present disclosure relates generally to computer networks, and, more particularly, to link aggregation in computer networks.

BACKGROUND

While some network devices may be called upon to support only a handful of link aggregation groups, others may be called upon to support hundreds, thousands, or even tens of thousands of link aggregation groups. Such configurations may be particularly susceptible to disruption due to stress conditions. For example, in such configurations, a system reload, or a control switchover, may cause a larger number of link aggregation groups to be formed, or reconfigured, within a short period of time, causing extreme stress. Similarly, in such configurations, control plane congestion may cause an excessive number of protocol data units (PDUs) to be lost, again causing stress.

Current link aggregation techniques often poorly cope with stress conditions. Such link aggregations techniques may continue to try to rapidly send PDUs, despite the stress. Often, the result is continuous link aggregation flapping, where a link aggregation group is repeatedly formed, then fails, then formed, then fails, over and over again. Link aggregation flapping, when it occurs, becomes a source of additional stress, compounding the underlying problem. Sometimes, the result is a complete failure of link aggregations to form.

BRIEF DESCRIPTION OF THE DRAWINGS

The embodiments described herein may be better understood by referring to the accompanying drawings in which like reference numerals indicate identical or functionally similar elements, of which:

FIG. 4 is an example protocol data unit that includes an encoding of periodic times that may be used with certain of the embodiments disclosed herein.

DESCRIPTION OF EXAMPLE EMBODIMENTS

Overview

Figure 1:
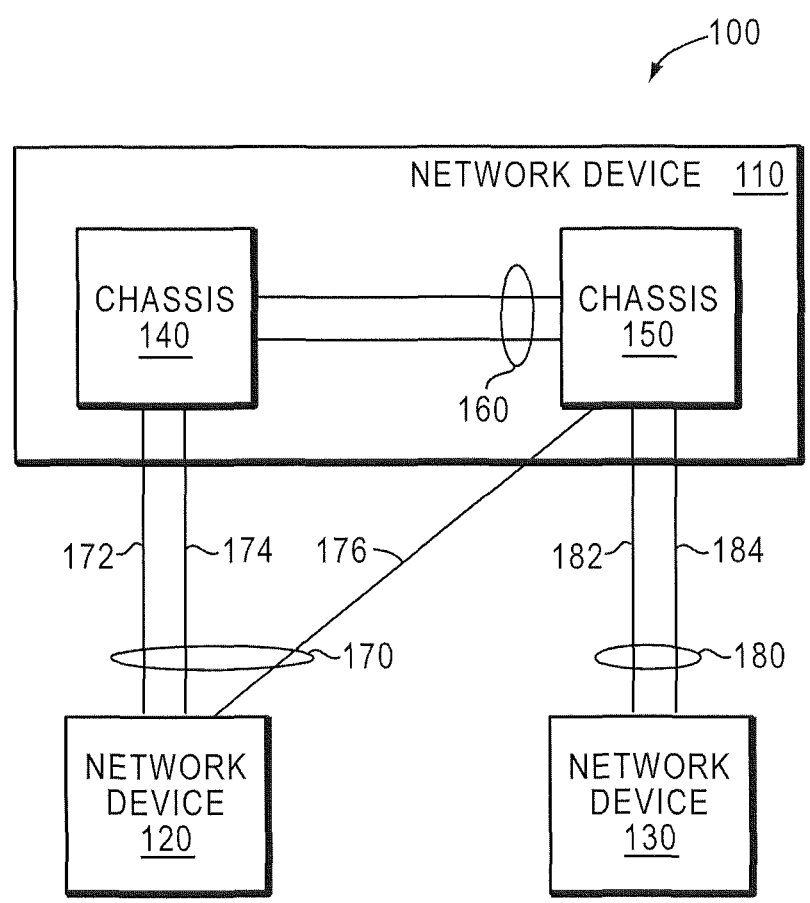
FIG. 1 is a schematic block diagram of an example computer network which may be used with the embodiments disclosed herein.

According to embodiments of the disclosure, the effects of stress conditions on link aggregations may be reduced by adjusting a period between periodic transmissions of protocol data units (PDUs) used to form and/or maintain a link aggregation group. Initially, the period between periodic transmissions of PDUs is set to a low fixed value. Upon the detection of a stress condition, the period between periodic transmissions of PDUs is increased from the initial fixed value, for example, first through slow linear growth, and subsequently through rapid exponential growth should stress continue. When it is determined that the stress condition has eased, the period between periodic transmissions of PDUs is decreased back toward the fixed value, for example, in a controlled manner.

DESCRIPTION

A computer network is a geographically distributed collection of physical links (e.g., Ethernet cabling, fiber optic connections, etc.), used to transport data between network device (e.g., switches, routers, computers, etc.). Many types of computer networks are available, including local area networks (LANs) and wide area networks (WANs). The network devices of a computer network typically communicate by exchanging discrete packets or messages according to pre-defined protocols. In this context, a protocol consists of a set of rules defining how network devices interact and/or interoperate with each other.

Many computer networks use some form of link aggregation to increase bandwidth and/or reliability. In link aggregation, multiple links between network devices are grouped (logically combined) to form a logical link that offers increased bandwidth and/or reliability. A control protocol is typically executed to facilitate link aggregation. Common link aggregation control protocols include Link Aggregation Control Protocol (LACP) standardized in Electrical and Electronics Engineers (IEEE) 802.1AX and Port Aggregation Protocol (PAgP) developed by Cisco Systems, Inc., however a variety of other link aggregation control protocols exist.

Link aggregation control protocols typical perform a number of tasks in order to support link aggregations. These tasks include checking if candidate links can actually be aggregated, creating new link aggregation groups, controlling the addition of links to existing link aggregation groups, monitoring the status of the aggregated links to ensure their membership in a link aggregation group is still valid, removing links from link aggregation groups if their membership is no longer valid, and removing link aggregation groups if they have an insufficient number of (e.g., 0) remaining member links. In order to perform these and other tasks, link aggregation protocols typically cause the network devices at opposing ends of link aggregations (commonly referred to respectively as the "actor" and the "partner") to exchange messages, such as protocol data units (PDUs). Depending on the link aggregation control protocol being used, these PDUs may take a variety of different forms. For example, in 802.1AX LACP, these PDUs may take the form of Link Aggregation Control PDUs (LACPDUs). Similarly, in PAgP, these PDUs may take the form of PAgP PDUs.

In order to perform these and other tasks, an actor and a partner typically maintain a number of protocol timers. At least some of these protocol timers control or otherwise relate to the exchange PDUs. Depending on the link aggregation control protocol being used, the protocol timers related to the exchange of PDUs may take a variety of different forms. Further details regarding certain protocol timers related to the exchange of PDUs may be found further below.

While some network devices may be called upon to support only a handful of link aggregation groups, others may be called upon to support hundreds, thousands, or even tens of thousands of link aggregation groups. For example, virtual switching systems (VSS) and multi-chassis LACP (mLACP) server access configurations often include multiple coupled physical switch chassis that are tasked with handling hundreds of link aggregation groups whose member links are distributed across the chassis. Further, massively scaled datacenter switches, that include multiple interconnected physical chassis, may be tasked with handling thousands or tens of thousand of link aggregation groups, whose member links are again distributed across the chassis.

FIG. 1 is a schematic block diagram of an example computer network 100 which may be used with the embodiments disclosed herein. The computer network 100 may include a plurality of interconnected network devices 110, 120, 130 coupled by links, at least some of which are aggregated into link aggregation groups. A network device may be a single-chassis network device, or, as shown with device 110, a VSS, mLACP configuration, or datacenter switch that pools multiple physical switch chassis 140, 150. An interconnect 160, such as a virtual switch link (VSL) or other interconnect that includes an aggregation of links, may couple the individual chassis 140, 150. Such a multi-chassis network device 110 may be coupled to other network devices 120, 130 by a plurality of links that, for example, extend from different chassis 140, 150. Various link aggregation groups may be formed to logically combine ones of the links. For instance, a first set of links 172, 174 and 176 may be placed in a first link aggregation group 170 to form a first logical link, while a second set of links 182,184 may be placed in a second link aggregation group 180 to form a second logical link. The links of a particular link aggregation group may be distributed among the various chassis of a multi-chassis network device. For example, the first link aggregation group 170 may include one or more links 172, 174 from one chassis 140, and one or more links 176 from another chassis 150. While only a small number of links and link aggregation groups are depicted in FIG. 1, it should be understood that typically configurations generally include a far larger number of links and link aggregation groups.

Figure 2:
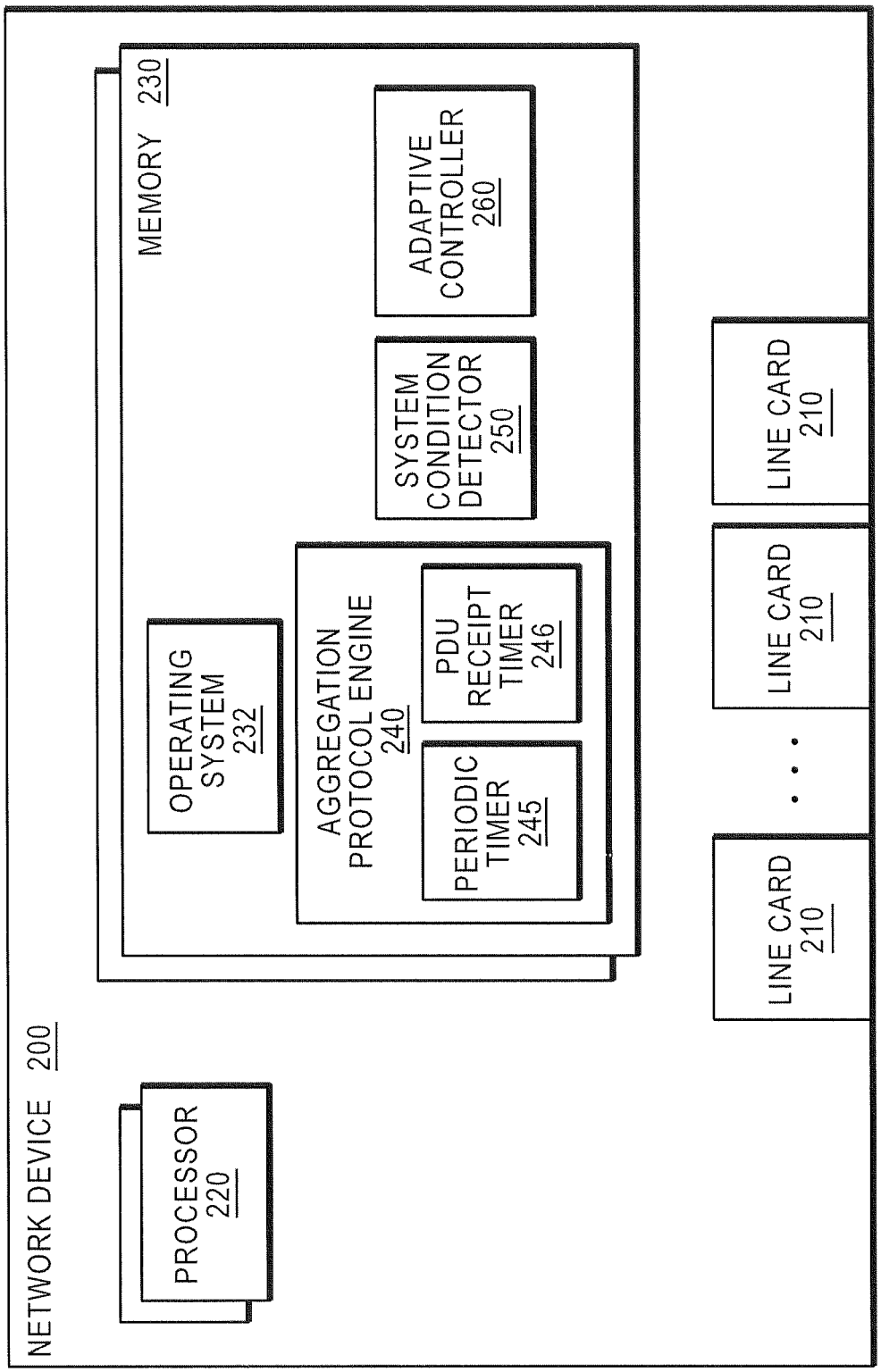
FIG. 2 is a schematic block diagram of an example network device which may be used with the embodiments disclosed herein.

FIG. 2 is a schematic block diagram of an example network device 200 which may be used with the embodiments disclosed herein. The network device 200 may be an example of any of network devices 110, 120 130, shown in FIG. 1. Should network device 200 represent a multi-chassis network device 110, it should be understood that the components of network device 200 may be distributed across multiple separate physical units, rather than be located in a single physical unit. In such case, the grouping of components in FIG. 2 should be interpreted as a logical grouping, rather than an indication that the components are physically within one chassis.

The network device 200 may include a plurality of line cards 210, one or more processors (e.g., CPU(s), microcontrollers, etc.) 220, and one or more memories 230 (e.g., random access memories (RAMs), magnetic storage devices, etc.), among other components. Each line card 210 may contain the mechanical, electrical, and signaling circuitry necessary to support one or more physical ports coupled to links. The one or more memories 230 may include a plurality of storage locations for storing software and data structures, including software and data structures used to implement at least some of the techniques disclose herein. The one or more processors 220 may include logic configured to execute the software and manipulate data from the data structures. While not shown in FIG. 2, at least some of the software and data may be temporarily stored in registers of the processors 220 in conjunction with their operation.

An operating system 232, portions of which are resident in the memories 230 and executed by the processors 220, functionally organizes the network device 200. The operating system 232 may be a version of Cisco Internetwork Operating System (IOS), or other suitable operating system. An aggregation protocol engine 240 may interact with the operating system 232 to implement link aggregation control functionality on the network device 200. When the network device 200 is operating as an actor for a link aggregation, the link aggregation protocol engine may operate as an actor aggregation protocol engine. The actor aggregation protocol engine may interact with a partner aggregation protocol engine executing on a partner at the opposing end of the link aggregation.

The actor aggregation protocol engine may be responsible for exchanging PDUs with the partner link aggregation protocol engine to form and maintain a link aggregation. As mentioned above, at least in some cases, this exchange of PDUs may be regulated by various protocol timers, which may be maintained by the actor aggregation protocol is engine and by the partner link aggregation protocol engine When a link aggregation group is forming (i.e., aggregating), the actor aggregation protocol engine exchanges PDUs with the partner aggregation protocol to bring the group online. Further, to maintain the formed (i.e., aggregated) group, the actor aggregation protocol engine exchanges PDUs with the partner aggregation protocol engine to confirm the aggregation's continuing operation and state. A periodic timer 245 of the actor aggregation protocol engine may trigger transmission of periodic PDUs to the partner aggregation protocol engine. Likewise, the partner aggregation protocol engine may include a periodic timer that triggers the transmission periodic PDUs to the actor aggregation protocol engine. The duration of the actor's periodic timer may be referred to herein as the "actor periodic time" and the duration of the partner's periodic timer may be referred to herein as the "partner periodic time". In 802.1AX LACP, each periodic timer may take the form of a "periodic_timer" of a LACP Periodic Transmission Machine. In other link aggregation control protocols, such as PAgP, the periodic timers may take different forms, or in some cases not be used.

Further, a PDU receipt timer 246 of the actor aggregation protocol engine may run for a timeout time within which a periodic PDU is expected to be received from the partner aggregation protocol engine. Likewise, the partner aggregation protocol engine may include a partner PDU receipt timer that performs a respective function. In 802.1AX LACP, each PDU receipt timer may take the form of a "current_while_timer" of a LACP Receive Machine. In other link aggregation control protocols, such as PAgP, the PDU receipt timers may take different forms, or in some cases not be used.

The periodic times and timeout times discussed above are typically set to fixed values in current link aggregation control protocols. While multiple fixed values may be used depending on the stage of aggregation (e.g., aggregating or aggregated), the values typically are not responsive to system conditions (e.g., stress conditions). For example, the periodic times and timeout times may be set to a relatively short value at the beginning stages of a link aggregation, while links are still aggregating, and to significantly longer values in later stages, when the aggregation has fully formed. However, this change is not based upon stress conditions that may be present at the actor or partner.

A number of stress conditions may occur that prevent the timely formation or proper maintenance of a link aggregation group. Such conditions may be particularly problematic in configurations where the number of aggregations is scaled into the hundreds, thousands, or tens of thousands. For example, in such configurations, a system reload (e.g., a hardware or software maintenance or upgrade), or a control switchover (e.g., a VSS or mLACP chassis failover) may cause a larger number of link aggregation groups to be formed, or reconfigured, within a short period of time, causing extreme stress. Similarly, in such configurations, control plane congestion (e.g., due to an ill-behaved peer, a denial of service (DoS) attack, contention among application processes, etc.) may cause an excessive number of PDUs to be lost, again causing stress.

Current link aggregation techniques often poorly cope with stress conditions, such as those described above. Such link aggregation techniques may continue to try to rapidly send PDUs at fixed times, despite the stress. Often, the result is continuous link aggregation flapping, where a link aggregation group is repeatedly formed, then fails, then formed, then fails, over and over again. Link aggregation flapping, when it occurs, becomes a source of additional system stress, compounding the underlying problem. Sometimes, the result is a complete failure of link aggregations to form.

As explained below, a system condition detector 250 working in conjunction with an adaptive controller 260 may implement a novel technique for minimizing the effects of stress conditions on link aggregations. Such technique may dynamically adjust a period between periodic transmissions of PDUs used to form and/or maintain a link aggregation group (e.g., a periodic time) in response to detected stress. In the absence of a stress condition, the period may be set to a low fixed value to enable a fast start. Upon the detection of a stress condition, the period may be increased, for example, first through slow linear growth, and subsequently through rapid exponential growth, should system stress continue. When stress returns to lower levels, the period may be returned, in a controlled manner, back toward the low fixed value. Through such dynamic adjustment of the period between periodic transmissions of PDUs, link aggregation flapping and link aggregation formation failure may be minimized.

The system condition detector 250 may detect a stress condition in any of a variety of manners, and provide a control signal to the adaptive controller 260. In one embodiment, the system condition detector 250 monitors one or more protocol timers, for example, the PDU receipt timer 246 (e.g., in 802.1AX LACP the "current_while_timer") discussed above. Expiration of the PDU receipt timer 246 typically indicates an issue with local system responsiveness, an ill-behaving partner, or presence of external stress, such as a DoS attack.

Alternatively, when synchronized network clocks are available, an explicit time stamp on a received periodic PDU may be used to gauge responsiveness and detect stress conditions. In yet another alternative, the length of a receiving queue (not shown) of the link aggregation protocol engine 240 may be monitored. The queue length may be used to gauge responsiveness and detect stress conditions. In yet another alternative, the system condition detector 250 may monitor completion time of individual aggregation operations. Such completion time may provide a gauge of responsiveness, being influenced by operations of hardware, software and inter-process communication, and thereby be used to detect stress conditions.

In response to a control signal from the system condition detector 250 indicating stress has been detected, the adaptive controller 260 may dynamically adjust the period between periodic transmissions of PDUs. For example, the adaptive controller 260 may cause a change to the partner periodic time used by a partner periodic timer (in 802.1AX LACP, the "periodic_timer"). Such change may be caused in various manners. In one embodiment, the adaptive controller 260 causes the actor aggregation engine to encode a partner periodic time setting within a field of one or more PDUs exchanged with the partner aggregation protocol engine. Further details of one possible implementation of such encoding are discussed below in reference to FIG. 4.

The adaptive controller 260 may initially adjust the periodic time to a relatively short fixed value to enable a fast start to link aggregations in unstressed cases. For example, the adaptive controller 260 may cause partner periodic time to initially be set to a constant value ("X") of 1 second. In an 802.1AX LACP implementation, setting the duration of the "periodic_timer" in such manner would conform to the IEEE 802.1AX standard setting.

When control signals from the system condition detector 250 indicate a stress condition is occurring, the adaptive controller 260 may increase the period between periodic transmissions of PDUs, for example, first through slow linear growth, and if the condition persists, subsequently through rapid exponential growth. Slow linear growth may give the aggregation process a chance to deal with light or sporadic stress without significantly slowing down. Rapid exponential growth may aggressively deal with persistent stress.

To provide for initial slow linear growth, the adaptive controller 260 may cause the partner periodic time to increase, for example, by addition of a delay factor ("Y") when certain measures of stress are met. The measures may vary depending on whether the link aggregation is still forming (i.e., aggregating), or if the link aggregation is fully formed (i.e., aggregated). In one implementation, in the case where the links are still aggregating, three consecutive expirations of the PDU receipt timer 246 (e.g., in 802.1AX LACP the "current_while_timer") without receipt of a PDU from the partner aggregation protocol engine aggregation may cause the adaptive controller 260 to add a delay factor ("Y") to the partner periodic time (i.e., partner periodic time+=Y), where Y is set to 1 second by default or administratively configured to a different value. In the case of a fully formed aggregation, two consecutive expirations of the PDU receipt timer 246 (e.g., in 802.1AX LACP the "current_while_timer") without receipt of a PDU from the partner aggregation protocol engine may cause the adaptive controller 260 to add a delay factor ("Y") to the partner periodic time (i.e., partner periodic time+=Y), where Y is set to 30 seconds by default or administratively configured to a different value. In other implantations, slow linear growth may be achieved by other types of adjustments.

Should system stress persist, the adaptive controller 260 may turn to rapid exponential growth, for example, causing the partner periodic time to increase by is multiplication by a factor of two. In one implementation, a subsequent expiration of the PDU receipt timer 246 (e.g., in 802.1AX LACP the "current_while_timer") without receipt of a PDU from the partner aggregation protocol engine (e.g., a fourth or subsequent consecutive expiration when links are still aggregating, or a third or subsequent consecutive aggregation when links are aggregated) may cause the adaptive controller 260 to multiply the partner periodic time by a factor or two (i.e., partner periodic time<<=1). An upper bound may be placed on the exponential growth. The upper bound may be set to a constant ("V") of 30 seconds. In an 802.1AX LACP implementation, setting the upper bound to 30 seconds would provide compatibility with the IEEE 802.1AX standard. Alternatively, the upper bound may be represented as a factor of two, for example 2.sup.Z, where "Z" may have a default value (e.g., 6) and be administratively configured to other values should they prove advantageous. In other implantations, rapid exponential growth may achieved by other types of changes.

When control signals from the system condition detector 250 indicate stress has eased, the adaptive controller 260 may decrease the period between periodic transmissions of PDUs, for example, returning the period back to its initial fixed value. The reduction may be performed in a controlled manner that is unlikely to cause link aggregation flapping or oscillations in the length of the period.

For example, to perform such a controlled reduction, the adaptive controller 260 may implement a reduction condition that must be fulfilled, as well as a lower bound. In one implementation, when a PDU from the partner aggregation protocol engine aggregation is normally received while the PDU receipt timer 246 is still running, and the reduction condition is met, the adaptive controller 260 subtracts a reduction factor ("N") from the partner periodic time (i.e., partner periodic time=N), where N is set to 1 second by default or administratively configured to a different value, provided the partner periodic time is not reduced below the lower bound. The reduction condition may be that the time of the receipt timer 246 (e.g., in 802.1AX LACP, the time of the "current_while_timer") is less than or equal to half the timeout time at the actor aggregation protocol engine (i.e., time of receipt timer<=actor timeout time>>1). It should be apparent that many alternative reduction conditions may also be employed.

The lower bound may vary depending on whether the link aggregation is still aggregating or is aggregated. For example, while still aggregating, the lower bound may be set to a constant value ("X") of 1 second. In an 802.1AX LACP implementation, setting the lower bound to 1 second would provide compatibility with the standard. When aggregated, the lower bound may be set to a constant value ("V") of 30 seconds. In an 802.1AX LACP implementation, setting the lower bound to 30 seconds in such circumstances would provide compatibility with the standard. Alternatively, the lower bound in an aggregated case may be set to a fast heartbeat value ("W"), where W is the length of time of the receipt timer 246 (e.g., in 802.1AX LACP the time of the "current_while_timer") divided by a power or two ("M") (i.e., W=time of the receipt timer<<M), where "M" may have a default value (e.g., 2) and be administratively configured to other values should they prove advantageous.

Figure 3:
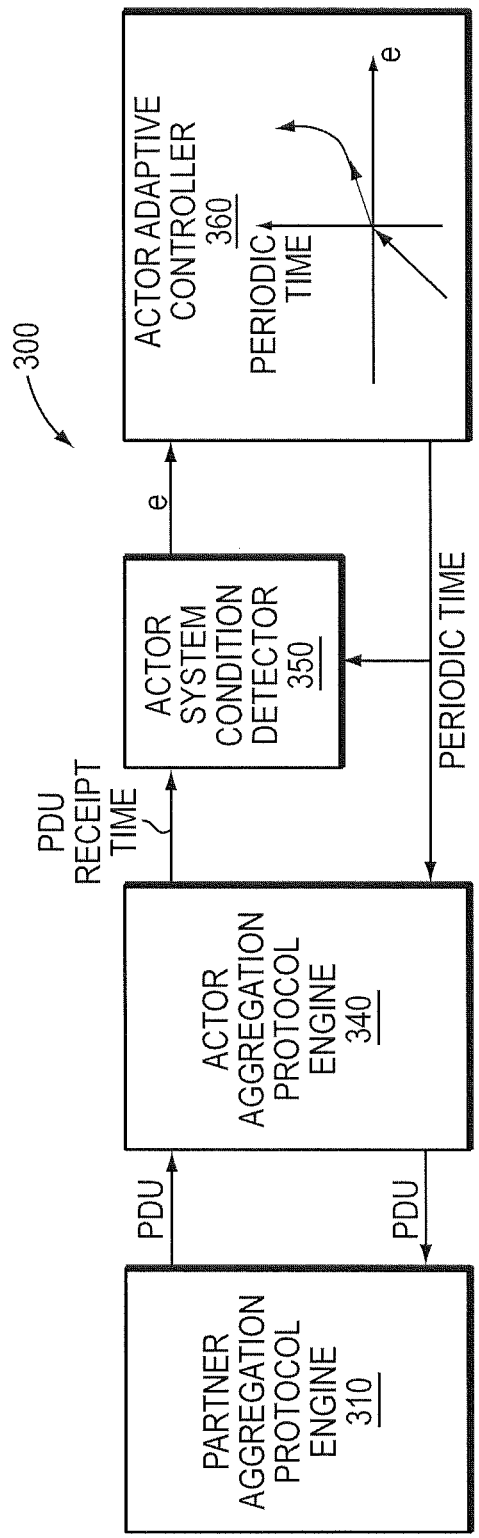
FIG. 3 is a diagram of an example adaptive control loop implemented by certain of the embodiments disclosed herein.

The above discussed operations to dynamically adjust the period between periodic transmissions of PDUs in response to detected stress may be envisioned as an adaptive control loop. FIG. 3 is a diagram 300 of an example adaptive control loop implemented by certain of the embodiments discussed above. A partner aggregation protocol engine 310 may exchange PDUs with an actor aggregation protocol engine 340. In response to information concerning the receipt of PDUs supplied by the actor aggregation protocol engine 320, and partner periodic time determined by an actor adaptive controller 360, an actor system condition detector 350 may provide an indication ("e") indicative of stress to the adaptive controller 360, which upon receipt influences the periodic time output there from. The periodic time output is looped back to the actor aggregation protocol engine 340 and to the actor system condition detector 350.

As discussed above, a change to partner periodic time may be caused by encoding a partner periodic time settings within a field of one or more PDUs exchanged with the partner aggregation protocol engine. FIG. 4 is an example PDU 400 that includes an encoding of periodic times. While in this example, the PDU 400 is a LACPDU used by 802.1AX LACP, it should be understood that other formats of PDUs may be employed with other link aggregation control protocols, for example, with PAgP or other protocols. The PDU 400 includes a number of fields whose functions are well known, including a destination address field 405, source address field 410, length/type field 415, a subtype field 420 and a version number field 420. The PDU 400 may also include a number of well-known type-length-value elements (TLVs), including an actor information TLV 430, a partner information TLV 450, a collector TLV 470, and a terminator TLV 480. At least a portion of one or more reserved fields in these TLVs may be repurposed to store periodic time settings. For example, a portion of the reserved field 445 following the actor state field 435 within the actor TLV 430 may be designated as an actor periodic time field 440 and used to propagate the periodic time value currently being used by the actor link aggregation protocol engine. Similarly, a portion of the reserved field 460 following the partner state field 455 within the partner TLV 450 may be designated as a partner periodic time field 460 and used to propagate the partner periodic time value the partner link aggregation protocol engine should use.

While it is discussed above, that the actor link aggregation protocol engine may adjust its partner's periodic PDU transmission rate by changing partner periodic time in response to a stress condition, in some embodiments, it may adjust its own periodic PDU transmission rate as well. Such adjustment may be driven by the partner, using technique similar to those described above. Upon receipt of a PDU from the partner indicating a different periodic time than what the actor is currently using, the actor aggregation protocol engine may simply update its periodic timer to use such value. When both actor and partner periodic times are dynamically adjusted, the actor periodic time may become different than the partner periodic time, unless otherwise regulated. In some implementations, the two aggregation protocol engines may select the same value for periodic time, for example, the one associated with the more stressed network device.

Figure 5:
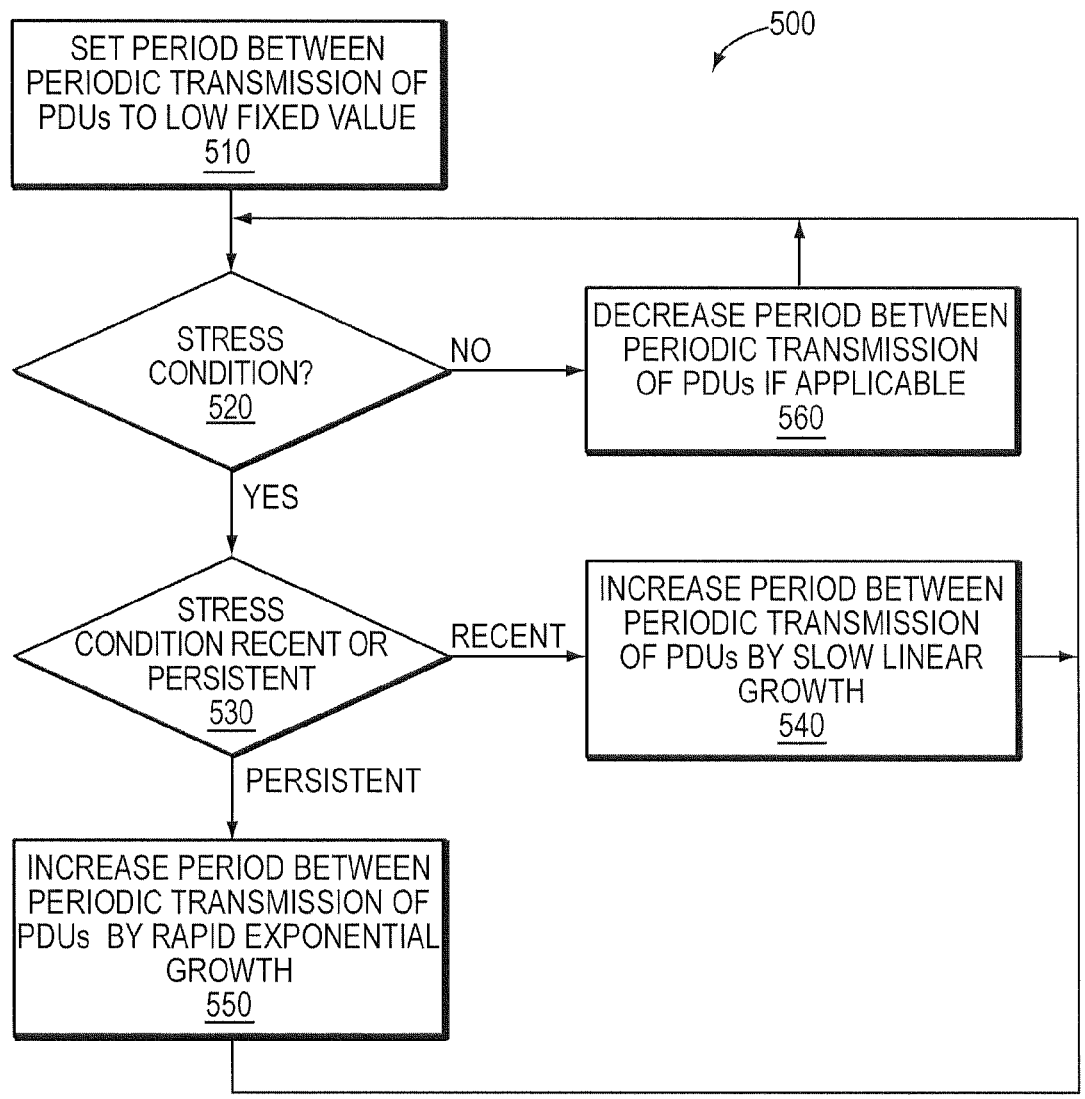
FIG. 5 is a flow diagram of an example sequence of steps for dynamically adjusting the period between periodic transmissions of PDUs used to form and/or maintain a link aggregation group in response to detected stress.

FIG. 5 is a flow diagram of an example sequence of steps 500 for dynamically adjusting the period between periodic transmissions of PDUs used to form and/or maintain a link aggregation group in response to detected stress. Initially, at step 510, the adaptive controller 260 may set the period between periodic transmissions of PDUs (e.g., partner periodic time) to a low fixed value (e.g., one second) to enable a fast start. At step 520, the system condition detector 250 detects whether a stress condition is present. If so, and a stress condition has been detected, execution proceeds to step 530, where it is determined whether the stress condition is a recent or a persistent condition. If the stress has just recently occurred, execution proceeds to step 540, where the adaptive controller 260 causes a small increase in the period between periodic transmissions of PDUs (e.g., partner periodic time), for example, by implementing an algorithm that provides for slow linear growth to the period. If the stress condition is persistent, execution proceeds to step 550, where the adaptive controller 260 causes a significant increase in the period between periodic transmissions of PDUs (e.g., partner periodic time), for example, by implementing an algorithm that provides for by rapid exponential growth to the period.

If, at step 520, the system condition detector 250 determines that there is no longer stress, or stress has eased somewhat, execution proceeds to step 560. At step 560, if the period between periodic transmissions of PDUs (e.g., partner periodic time) has been increased due to operations of steps 540 or 550 in previous iterations, the period may be decreased by a certain amount, back toward the low fixed value. Thereafter, execution may loop back to step 520, where the system condition detector 250 continues to check for a stress condition.

The above described embodiments may reduce link aggregation flapping and/or complete aggregation failure by dynamically adjusting the period between periodic transmissions of PDUs used to form and/or maintain a link aggregation group in response to detected system stress. It should be understood that various adaptations and modifications may be made within the spirit and scope of the embodiments.

For example the above-described embodiments may be implemented in software, in hardware, or a combination thereof. A software implementation may include processor-executable instructions stored in one or more non-transitory computer-readable media, such as a volatile or persistent memory, a hard-disk, a compact disk (CD), or other media. A hardware implementation may include configured processors, logic circuits, application specific integrated circuits, and/or other types of hardware components. Further, a combined software/hardware implementation may include both processor-executable instructions stored in a non-transitory computer-readable media, as well as one or more hardware components, for example, processors, memories, etc. Accordingly, it should be understood that the above descriptions are meant to be taken only by way of example. It is the object of the appended claims to cover all such variations and modifications as come within the true spirit and scope of the embodiments herein.

What is claimed is:

1. A method comprising:
    detecting, by a network device, a first stress condition affecting a link aggregation group while the link aggregation group is forming, the link aggregation group comprising the network device and a partner network device, wherein detecting the first stress condition comprises one of:
        monitoring a completion time of one or more individual aggregation operations, or
        monitoring a number of consecutive expirations of a PDU receipt timer;
    based on the first stress condition, increasing a time period between periodic transmissions of control data by adding a first delay factor to the time period;
    detecting, by the network device, a second stress condition affecting the link aggregation group after the link aggregation is formed; and
    based on the second stress condition, increasing the time period by adding a second delay factor to the time period, wherein the second delay factor is greater than the first delay factor.

2. The method of claim 1, further comprising:
    initially setting the time period to a low fixed value.

3. The method of claim 1, wherein the control data comprises protocol data units (PDUs).

4. The method of claim 1, further comprising:
    detecting, by the network device, a third stress condition affecting the link aggregation group, wherein the third stress condition is detected when a threshold number of subsequent expirations of a PDU timer is detected; and
    based on the third stress condition, multiplying the time period by a third delay factor.

5. The method of claim 4, wherein the threshold number of subsequent expirations of the PDU timer is higher when the link aggregation group is forming than when the link aggregation group is formed.

6. The method of claim 4, wherein the time period has an upper bound.

7. The method of claim 6, wherein the upper bound is a fixed amount of time.

8. The method of claim 6, wherein the upper bound is represented as $2^Z$ seconds, where Z is a default value that can be administratively configured to another value.

9. The method of claim 1, further comprising:
    detecting that a reduction condition has been met; and
    subtracting a reduction factor from the time period.

10. The method of claim 9, wherein the time period has a lower bound.

11. The method of claim 10, wherein the lower bound is a fixed amount of time.

12. The method of claim 10, wherein the lower bound is a fast heartbeat value.

13. The method of claim 1, wherein the time period is a partner periodic time of the partner network device, wherein the partner periodic time is used to trigger transmission of the control data from the partner network device to the network device.

14. The method of claim 1, wherein at least one of the first stress condition or the second condition is related to at least one of a system reload, a maintenance, an upgrade, a control switchover, a control plane congestion, a denial-of-service attack, a contention among application processes, or a large number of link aggregation groups being formed or reconfigured within a short period of time.

15. The method of claim 1, wherein increasing the time period comprises encoding a new partner periodic time setting within a field of the control data exchanged with the partner network device.

16. A networking device comprising:
    a computer processor; and
    a non-transitory computer-readable storage medium storing instructions which, when executed by the computer processor, cause the networking device to perform operations comprising:
        detecting a first stress condition affecting a link aggregation group while the link aggregation group is forming, the link aggregation group comprising the network device and a partner network device, wherein detecting the first stress condition comprises one of:
            monitoring a completion time of one or more individual aggregation operations, or monitoring a number of consecutive expirations of a PDU receipt timer;

based on the first stress condition, increasing a time period between periodic transmissions of control data by adding a first delay factor to the time period;

detecting a second stress condition affecting the link aggregation group after the link aggregation is formed; and based on the second stress condition, increasing the time period by adding a second delay factor to the time period, wherein the second delay factor is greater than the first delay factor.

17. The networking device of claim 16, wherein the instructions cause the networking device to perform operations further comprising:

detecting a third stress condition affecting the link aggregation group, wherein the third stress condition is detected when a threshold number of subsequent expirations of a PDU timer is detected; and based on the third stress condition, multiplying the time period by a third delay factor.

18. A non-transitory computer-readable medium storing instructions which, when executed by a networking device, cause the networking device to perform operations comprising:

detecting a first stress condition affecting a link aggregation group while the link aggregation group is forming, the link aggregation group comprising the network device and a partner network device, wherein detecting the first stress condition comprises one of:

monitoring a completion time of one or more individual aggregation operations, or monitoring a number of consecutive expirations of a PDU receipt timer;

based on the first stress condition, increasing a time period between periodic transmissions of control data by adding a first delay factor to the time period;

detecting a second stress condition affecting the link aggregation group after the link aggregation is formed; and based on the second stress condition, increasing the time period by adding a second delay factor to the time period, wherein the second delay factor is greater than the first delay factor.

19. The non-transitory computer-readable medium of claim 18, wherein the instructions cause the networking device to perform operations further comprising:

detecting a third stress condition affecting the link aggregation group, wherein the third stress condition is detected when a threshold number of subsequent expirations of a PDU timer is detected; and based on the third stress condition, multiplying the time period by a third delay factor.

* * * * *